Figure 1:
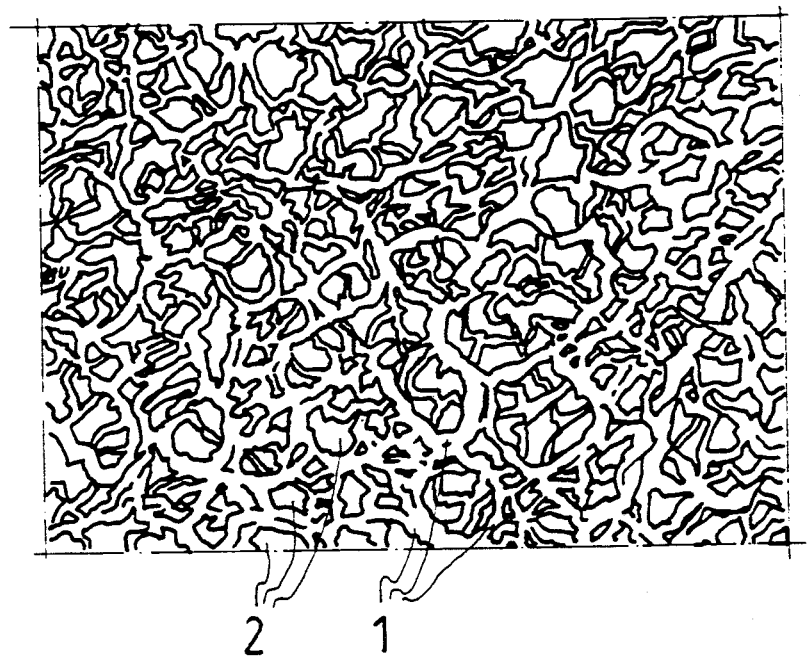

United States Patent [19]

Laiho et al.

[11] Patent Number: 5,132,123

[45] Date of Patent: Jul. 21, 1992

[54] FEED AND A PROCESS FOR ITS PRODUCTION

[76] Inventors: Stiven Laiho, Westendintie 53, SF-02106 Espoo, Finland; Rune Nyström, Hopom, P.O. Box 230 A, SF-0790 Loviisa, Finland

[21] Appl. No.: 642,708

[22] Filed: Jan. 17, 1991

Related U.S. Application Data

[63] Continuation of Ser. No. 437,653, Nov. 16, 1989, abandoned.

[51] Int. Cl.$^5$ .............................................. A23K 1/00
[52] U.S. Cl. ...................... 426/74; 426/520; 426/524; 426/601; 426/623; 426/630; 426/807
[58] Field of Search ............ 426/623, 2, 74, 601, 426/630, 643, 454, 634, 807, 524, 520

[56] References Cited

U.S. PATENT DOCUMENTS

| | | | |
|---|---|---|---|
| 4,804,547 | 2/1989 | Vanderbilt et al. | 426/601 |
| 4,826,694 | 5/1989 | McAskie | 426/601 |
| 4,853,233 | 8/1989 | McAskie | 426/601 |
| 4,883,684 | 11/1989 | Yang | 426/601 |

FOREIGN PATENT DOCUMENTS 0089376 8/1983 European Pat. Off. .

OTHER PUBLICATIONS

Hawley "The Condensed Chemical Dictionary" Tenth Edition Van Nostrand Reinhold Co. (1982) pp. 183 and 635.

*Primary Examiner*—R. B. Penland
*Attorney, Agent, or Firm*—Dressler, Goldsmith, Shore, Sutker & Milnamow, Ltd.

[57] ABSTRACT

The invention relates to a feed and to a process for its production. According to the process, a fatty substance is converted to the form of a metal salt of a fatty acid or fatty acids, and is combined with a carrier such as a concentrated feed. In the salt form the salt is protected in such a way that it will not disturb the disintegration taking place in the rumen of a ruminant, but it is, nevertheless, exploitable by the digestive system of the animal. What is essential in the invention is that the metal salt is formed into a three-dimensional matrix so that a substantially liquid fat or fatty acids remain in the cavities of the matrix. In a matrix form such as this the fat is fluid, and it can be transferred and batched like a liquid. It is possible to use vegetable oils which contain unsaturated fats and fatty acids for the production of a feed, whereby the fats and fatty acids can be caused, by means of the protection, to pass through the digestive system of a ruminant to the milk produced.

14 Claims, 1 Drawing Sheet

FEED AND A PROCESS FOR ITS PRODUCTION

This application is a continuation of application Ser. No. 07/437,653, filed Nov. 16, 1989, now abandoned.

The present invention relates to a process for the production of a feed, wherein a fatty substance is converted to the form of a metal salt of a fatty acid or fatty acids and is combined with a carrier. In addition, the invention relates to a feed produced by the said process.

Especially in the feeding of ruminants, fatty substances such as free fatty acids and triglycerides are incorporated into the feed. The purpose is to make the fat pass through the digestive system of the animal into the milk, whereby the properties of the butter obtained from the milk can be affected by means of the feed. However, the problem involved with the said fatty substances has been that they may disturb the functioning of the animal's rumen. For example, glycerides tend to form on the surface of the fibers in the feed a film which hampers the digestion of the fibers by acting as a physical obstacle to microbes which disintegrate fibers. In addition, free fatty acids may have toxic action on some rumen microbes.

Efforts have been made to solve the above problems by converting to a protected form the fats to be incorporated into a feed. A common method of protection has been to convert the fats to calcium salts. These salts pass unchanged through the rumen of a ruminant, the fat passing thereafter through the animal's blood circulation into its milk. When unsaturated fats are used, which are present especially in vegetable oils, these fats can, by means of such protection, be transferred as such into the milk so that, under their effects, the melting point of the butter prepared from the milk is lowered and the spreadability of the butter is improved.

There have, however, been certain practical problems in the use of fats protected as calcium salts. These problems are due to the fact that the calcium salts of the oleic, linoleic and linolenic acids present in vegetable oil are waxlike or amorphous, for which reason their preparation is difficult and the product obtained is sticky and difficult to handle. Nevertheless, the use of high-quality vegetable oils such as rape-seed oil, soy-bean oil, sunflower oil and olive oil, which contain the said acids, would be desirable because of their easy availability and their improving effect on butter. One solution would be to use individual acids in as pure a form as possible, in which case the calcium salt obtained would be more solid, but this is prevented by the higher price of the pure acids.

The object of the present invention is to provide a system of a new kind, by means of which the fat can be converted to a protected form without the above disadvantages connected with the prior art. The invention is based on the converting of the fat to a metal salt of a fatty acid or fatty acids, and it is characterized in that the metal salt is formed into a three-dimensional matrix in such a manner that there is left in the cavities of the matrix substantially liquid fat or fatty acids.

All the advantages of protected fats are achieved by means of the invention, i.e. the fat does not break down in the rumen of a ruminant and does not disturb its function but is, nevertheless, in a digestible form and exploitable by the animal's digestive system. In addition, it is an essential advantage of the invention that the matrix-structured protected fat is easier to handle than the prior-art fats protected in the form of a calcium salt.

The matrixstructured fat according to the invention is namely fluid at room temperature, in which case it can be transferred by pumping and be batched simply by pouring. The fat mixes easily with the carrier, such as concentrated feed, which also binds the fat more effectively than it binds prior art liquid fats. It is also essential that in the fat protected according to the invention both the metal salt which forms the matrix and the liquid fat remaining in the cavities of the matrix are, equally, feed fats which can be exploited by an animal.

According to the invention, the matrix can be formed by allowing a mixture which contains one or more free fatty acids to react with a metal compound such as a metal oxide or a metal hydroxide, and by cooling the mixture so that the formed salt crystallizes and entraps the remaining fatcontaining liquid component of the mixture in its cavities. Alternatively, the matrix can be formed by adding a metal salt of a fatty acid or of fatty acids to a hot liquid fatty-substance mixture and by cooling the mixture so that the salt crystallizes in the form of a matrix, entrapping some of the liquid fatty substance in its cavities. In either case, the result is a Vaseline-like threedimensional matrix structure, in which form the fat has those of the above-mentioned properties which are the objective of the invention.

According to one preferred embodiment of the invention, a multivalent alcohol, such as glycerol, or a surface-active agent is incorporated into the liquid phase remaining in the cavities of the matrix. By means of these substances it is possible to affect the physical properties of the product; this is based on the fact that the substances stabilize the crystal structure of the matrix-form salt. The said substances can be incorporated into the liquid fattysubstance mixture even before the formation of the matrix.

As was stated above, another object of the invention is a feed which can be produced according to the process described. The feed according to the invention contains, in a manner known per se, a metal salt of one or more fatty acids, combined with a carrier, and it is characterized in that it contains a metal salt formed into a three-dimensional matrix in the cavities of which there is entrapped substantially liquid fat or fatty acids.

The feed according to the invention may advantageously contain in its matrix structure a metal salt of one or more unsaturated fatty acids such as oleic acid, linoleic acid and/or linolenic acid. The said acids may be derived from a vegetable oil such as rape-seed oil, soy-bean oil, sunflower oil or olive oil. However, oils of other kinds may also be used as the source of fatty acid, for example fish oil or tall oil, or pure or hard fatty acids, refinement byproducts containing varying amounts of free fatty acids, or thermally or enzymatically produced fatty acids. The cation in the salt to be prepared is preferably calcium or magnesium.

A feed prepared according to the invention is especially suitable as cattle feed, in which the carrier may be concentrated feed to which the matrix-form fatty substance is added. However, the scope of the invention is not limited to the feeding of ruminants; the feed according to the invention may also have other uses, for example in fish farming. Thus the feed may be a fish feed formed into pellets or other such particles, containing a fatty acid converted to matrix form, combined with a carrier. The advantage of the invention in this, as well as in cattle feed, is that in matrix form a greater amount of fat can be bound to the carrier and also that, during transport and storage, the fat does not separate from it as easily as before.

Furthermore, the invention relates to the use of a metal salt of a fatty acid or fatty acids, converted to a three-fatty dimensional matrix, the cavities of the matrix containing a substantially liquid fat or fatty acids, as a feed to be given to animals, mixed with a carrier such as a concentrated feed.

The invention is clarified below in greater detail with reference to the accompanying drawing, which depicts a fat converted to a matrix form in accordance with the invention, and with embodiment examples.

The accompanying drawing shows a three-dimensional matrix structure which has been produced according to the invention and comprises more or less band-like formations 1 of a metal salt of a fatty acid, criss-crossing in different directions. Between these bands 1 there are left cavities 2, which are filled with a liquid fatty substance such as free fatty acids and/or triglycerides. The matrixstructured fat is a pulp which is fluid at room temperature and can be handled in the same manner as liquids.

Example 1

200 kg of a fat which contained free rape fatty acids 70% and glycerides 30% was heated to a temperature of 85° C. 13 kg of calcium hydroxide moistened with water was added to the fat. The temperature was raised to 90° C. and a reaction was allowed to occur. In order to evaporate the water, the temperature was raised to 120° C., whereafter the mixture was cooled. The fatty acid calcium salt formed during the cooling crystallized, forming a three-dimensional matrix which entrapped the remaining liquid phase in its cavities.

The matrix-form protected fat which was obtained was tested by comparing it to rape-seed oil and the normal diet on the trial farm in a feeding experiment carried out on 12 cows. The matrix-form protected fat and rape-seed oil were each mixed with a soy-grain mixture so that the fat content of the feed was 8%. The mixing was carried out using an ordinary feed mixer, by means of which a very homogeneous mixing was accomplished. The said normal diet consisted of a feed having a fat content of 3%.

The results of the feeding experiment are shown in the following table. The results include the iodine number measured from the milk, depicting the degree of unsaturation of the milk fat, and the daily milk production, the values of which have been corrected to correspond to a fat content of 4%.

| Feed | Iodine number | Corrected milk production (kg/d) |
| --- | --- | --- |
| Protected fat | 35 | 28.0 |
| Rape-seed oil | 34 | 25.4 |
| Normal diet | 29 | 27.8 |

The results show that, both with the use of the fat protected according to the invention and with the use of rape-seed oil, the iodine number increased as compared with the normal diet; this indicates that the degree of unsaturation of the milk fat increased. It is also seen that, when the fat protected according to the invention is used, a detrimental decrease in milk production is avoided; such decrease occurs when unprotected rape-seed oil is used. Examples 2-8

Example 2

200 g of a by-product of refining, having a fatty acid content of 60%, and 15.7 g of calcium hydroxide were treated according to Example 1. The fatty acids were derived from rape-seed oil, soy-bean oil, sunflower oil, and palm oil. The physical properties of the matrix-form product obtained were in accordance with Example 1.

Example 3

200 g of rape-seed fat, having a fatty acid content of 70 %, and 6.9 g of calcium oxide were treated according to Example 1. The physical properties of the product were in accordance with Example 1.

Example 4

200 g of rape-seed fat, having a fatty acid content of 70 %, and 10 g of magnesium oxide were treated according to Example 1. The physical properties of the product were in accordance with Example 1.

Example 5

200 g of rape-seed fat, having a fatty acid content of 70 %, and 14.5 g of magnesium hydroxide were treated according to Example 1. The physical properties of the product were in accordance with Example 1.

Example 6

60 g of rape-seed fat was heated to 100° C., and 140 g of calcium salts of rape fatty acids were added to it. The mixture was heated to 120° C. and was cooled under agitation. The physical properties of the product were in accordance with Example 1.

Example 7

Two trial feeds were mixed. Feed 1 comprised the product according to Example 1 20% and extracted crushed soy-beans 80%. Feed 2 comprised rape-seed oil 20% and extracted crushed soy-beans 80%. Feed 1 remained homogeneous, but part of the oil of feed 2 separated as early as within 12 hours.

Example 8

The product according to claim 1 and the same product, to which glycerine 7% had been added, were placed on a blotting paper. At 7 hours, the product which contained glycerine had bled 70% less oil than had the reference product.

For an expert in the art is self-evident that the different embodiments of the invention are not limited to the above examples; they can vary within the accompanying claims. Thus, it is possible, in addition to the matrix-forming metal salt and the liquid fat or fatty acids, to incorporate into the fatty components also additives such as vitamins, which may be dissolved in the liquid phase entrapped in the cavities of the matrix.

I claim:

1. A process for the production of feed comprising the steps of
   bringing a fatty constituent containing one or more free fatty acids into reaction at an elevated temperature with a metal compound selected from the group consisting of calcium and magnesium oxides and hydroxides to produce a metal salt of said one or more fatty acids, together with a remnant of said fatty constituent, the metal salt and said fatty remnant being obtained as a liquid phase cooling said liquid phase so that said metal salt is crystallized in the form of a three-dimensional matrix, consisting of substantially band-like formations crisscrossing in different directions and defining cavities between said band-like formations, said cavities entrapping said fatty remnant in liquid form, said matrix being obtained in a fluid state, and combining the matrix with a carrier.

2. A process according to claim 1 wherein said fatty constituent contains triglycerides which are left to the fatty remnant entrapped in the cavities of the matrix.

3. A process according to claim 1 wherein the fatty remnant contains free fatty acids left over from the reaction with the metal compound.

4. A process according to claim 1 wherein said one or more fatty acids are selected from the group consisting of oleic acid, linoleic acid and linolenic acid.

5. A process according to claim 1 wherein an additive selected from the group consisting of multivalent alcohols and surface-active agents is incorporated in the fatty remnant entrapped in the cavities.

6. A process according to claim 5 wherein said additive is glycerol.

7. A process for the production of feed comprising the steps of
   bringing a fatty constituent containing at least one fatty substance to an elevated temperature to form a liquid phase,
   adding a calcium or magnesium metal salt of one or more fatty acids to said liquid phase, thereby obtaining a metal salt-containing liquid,
   cooling the obtained metal salt-containing liquid so that said metal salt is crystallized i the form of a three-dimensional matrix, consisting of substantially band-like formations crisscrossing in different directions and defining cavities between said band-like formations, while said fatty constituent is entrapped in said cavities in liquid form, said matrix being obtained in a fluid state, and
   combining the matrix with a carrier.

8. A process according to claim 7 wherein said fatty constituents contains at least one substances selected from the group consisting of free fatty acids and triglycerides.

9. A process according to claim 7 wherein said metal salt is a salt of one or more fatty acids selected from the group consisting of oleic acid, linolenic acid and linolenic acid.

10. A feed comprising a carrier admixed with a calcium or magnesium metal salt of one or more fatty acids, in the form of a fluid, three-dimensional matrix having substantially band-like formations crisscrossing in different directions and defining cavities therebetween that contain a substantially liquid fat or fatty acid therein, said fluid, three-dimensional matrix being in a sufficiently fluid state to be handled as a liquid.

11. A feed according to claim 10 wherein said metal salt is a salt of one or more fatty acids selected from the group consisting of oleic acid, linoleic acid and linolenic acid.

12. A feed according to claim 10 wherein said metal salt is a salt of the fatty acid of a vegetable oil selected from the group consisting of rapeseed oil, soybean oil, sunflower oil and olive oil.

13. A feed according to claim 10 for use as cattle feed wherein said carrier is a grain-based concentrated feed.

14. A feed according to claim 10 for use as fish feed wherein said feed is in pellet or like particle form.

* * * * *

UNITED STATES PATENT AND TRADEMARK OFFICE
CERTIFICATE OF CORRECTION

PATENT NO. : 5,132,123

DATED : July 21, 1992

INVENTOR(S) : Stiven Laiho and Rune Nystrom

It is certified that error appears in the above-identified patent and that said Letters Patent is hereby corrected as shown below:

Column 1, line 34, "effects" should be --effect--.

Column 2, line 1, "matrixstructured" should be --matrix-structured--.

Column 3, line 5, "three-fatty dimensional" should be --three-dimensional--.

Column 3, line 21, "matrixstructured" should be --matrix-structured--.

Column 3, line 68, "Examples 2-8" should be a separate paragraph heading.

Column 5, line 33, "i the form" should be --in the form--.

Column 6, line 7, "substances" should be --substance--.

Signed and Sealed this

Twenty-eighth Day of September, 1993

Attest:

BRUCE LEHMAN

Attesting Officer     Commissioner of Patents and Trademarks